United States Patent
Otsuka et al.

(10) Patent No.: US 10,318,371 B2
(45) Date of Patent: Jun. 11, 2019

(54) APPARATUS AND METHOD TO DETERMINE A SETTING ITEM CAUSING AN INCIDENT BASED ON ACTION RECORDS THEREFOR

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 15/617,221

(22) Filed: Jun. 8, 2017

(65) Prior Publication Data
US 2017/0357543 A1    Dec. 14, 2017

(30) Foreign Application Priority Data
Jun. 13, 2016 (JP) .................................. 2016-117017

(51) Int. Cl.
*G06F 11/07* (2006.01)
(52) U.S. Cl.
CPC ........ *G06F 11/079* (2013.01); *G06F 11/0709* (2013.01); *G06F 11/0754* (2013.01)
(58) Field of Classification Search
CPC .............................. G06F 11/07; G06F 11/0709
USPC ........................................ 714/37, 47.2, 47.3
See application file for complete search history.

(56) References Cited

U.S. PATENT DOCUMENTS

| | | | | |
|---|---|---|---|---|
| 7,194,543 B2* | 3/2007 | Robertson | .............. | G06Q 10/06 709/226 |
| 2005/0240943 A1* | 10/2005 | Smith | ..................... | G06F 9/465 719/328 |
| 2007/0022327 A1* | 1/2007 | Otsuka | ................ | G06F 11/3419 714/47.2 |
| 2008/0059120 A1* | 3/2008 | Xiao | ..................... | G06F 11/008 702/184 |
| 2008/0250361 A1* | 10/2008 | Bae | .......................... | G03F 1/72 716/132 |

(Continued)

FOREIGN PATENT DOCUMENTS

| | | |
|---|---|---|
| JP | 2014-120138 | 6/2014 |
| JP | 2014-134956 | 7/2014 |

(Continued)

*Primary Examiner* — Kamini B Patel
(74) *Attorney, Agent, or Firm* — Staas & Halsey LLP

(57) ABSTRACT

For each setting-file, an apparatus obtains, from first action-records, an occurrence-count value that is associated with the each first action-record and indicates a number of occurrences of a setting-item name identifying each setting-item for the each setting-file, in association with a sequence number assigned to the each first action-record, where each first action-record records an action that is taken in response to a first-incident. When there exists a first setting-file for which an occurrence-pattern generated based on a sequence of occurrence-count values that are each associated with different one of the sequence numbers assigned to the first action-records is similar to a model pattern that is in advance obtained from second action-records for second-incidents occurring due to a setting error of a setting-value that is set to the first setting file, the apparatus stores the first setting-file in association with an identifier identifying the first-incident.

17 Claims, 16 Drawing Sheets

(56) References Cited

U.S. PATENT DOCUMENTS

| | | | |
|---|---|---|---|
| 2011/0161743 A1* | 6/2011 | Kato | G06F 11/0709 |
| | | | 714/47.2 |
| 2011/0185236 A1* | 7/2011 | Watanabe | G06F 11/0709 |
| | | | 714/48 |
| 2012/0158701 A1* | 6/2012 | Otsuka | G06F 16/213 |
| | | | 707/722 |
| 2014/0172369 A1 | 6/2014 | Ikeda et al. | |
| 2014/0298112 A1* | 10/2014 | Otsuka | G06F 11/3452 |
| | | | 714/47.3 |
| 2015/0113337 A1* | 4/2015 | Otsuka | G06F 11/0709 |
| | | | 714/47.3 |
| 2015/0286488 A1* | 10/2015 | Watanabe | G06F 9/44505 |
| | | | 713/100 |
| 2016/0092289 A1* | 3/2016 | Otsuka | G06F 11/0751 |
| | | | 714/37 |

FOREIGN PATENT DOCUMENTS

| | | |
|---|---|---|
| JP | 2015-153078 | 8/2015 |
| JP | 2015-232757 | 12/2015 |

\* cited by examiner

FIG. 3

INCIDENT ID: 001 ← 41A

ACTION RECORDS

SEQUENCE NUMBER 1  — 41C   41B

WE HAVE A QUESTION ABOUT HOW TO ADDRESS AN INCIDENT.
(SNIP)
THE FOLLOWINGS ARE OUR SETTINGS DATA.
[fjse@XXX ~]$ uname -a
Linux XXXXXX 2.6.32-279.el6.x86_64 #1 SMP Wed Jun 13 :
[root@XXX fjse]# more /etc/hosts
127.0.0.1 localhost localhost.localdomain localhost4 localhost4.localdomain4
[root@XXX fjse]# more /etc/sysconfig/network
NETWORKING=yes
HOSTNAME=XXX
GATEWAY=XXX.XXX.XXX.XXX
…

⋮

SEQUENCE NUMBER 10 — 41C   41B

GATEWAY IS TO BE SET IN /etc/sysconfig/network-scripts/ifcfg-eth0, NOT IN /etc/sysconfig/network.
(EXAMPLE)
BOOTPROTO=manual
IPADDR=xxx.xxx.xxx.xxx
GATEWAY=xxx.xxx.xxx.xxx  ★
…

| id | SETTING-FILE NAME | SETTING-ITEM NAME |
|---|---|---|
| 1 | /etc/sysconfig/network-scripts/ifcfg-eth0 | GATEWAY |
| 2 | /etc/sysconfig/network-scripts/ifcfg-eth0 | NETMASK |
| 3 | /etc/sysconfig/network-scripts/ifcfg-eth0 | IPADDR |
| 4 | /etc/sysconfig/network-scripts/ifcfg-eth0 | BOOTPROTO |
| 5 | /etc/sysconfig/network-scripts/ifcfg-eth0 | DNS1 |
| 6 | /etc/sysconfig/network | HOSTNAME |

FIG. 5

| id | INCIDENT ID | SETTING-FILE NAME | SETTING-ITEM NAME | SEQUENCE NUMBER 1 | SEQUENCE NUMBER 2 | ... | SEQUENCE NUMBER 9 | SEQUENCE NUMBER 10 |
|---|---|---|---|---|---|---|---|---|
| 1 | 001 | /etc/sysconfig/network-scripts/ifcfg-eth0 | GATEWAY | 1 | 0 | ... | 0 | 4 |
| 2 | 001 | /etc/sysconfig/network-scripts/ifcfg-eth0 | NETMASK | 1 | 0 | ... | 0 | 2 |
| 3 | 001 | /etc/sysconfig/network-scripts/ifcfg-eth0 | IPADDR | 1 | 0 | ... | 0 | 2 |
| 4 | 001 | /etc/sysconfig/network-scripts/ifcfg-eth0 | BOOTPROTO | 1 | 0 | ... | 0 | 2 |
| 5 | 001 | /etc/sysconfig/network-scripts/ifcfg-eth0 | DNS1 | 1 | 0 | ... | 0 | 2 |
| 6 | 001 | /etc/sysconfig/network | HOSTNAME | 1 | 0 | ... | 0 | 1 |

FIG. 6

| id | INCIDENT ID | SETTING-FILE NAME | OCCURRENCE PATTERN |
|---|---|---|---|
| 1 | 001 | /etc/sysconfig/network-scripts/ifcfg-eth0 | {0, 0, 0, 0, 0, 0, 0, 0, 0, 0.2} |
| 2 | 001 | /etc/sysconfig/network | {1, 0, 0, 0, 0, 0, 0, 0, 0, 1} |

FIG. 7

| SETTING-FILE NAME | MODEL PATTERN |
|---|---|
| /etc/sysconfig/network-scripts/ifcfg-eth0 | {0.1, 0, 0, 0, 0, 0, 0, 0, 0.25} |
| /etc/sysconfig/network | {1, 0, 0, 0, 0, 0, 0, 0, 0, 1} |

| id | INCIDENT ID | SETTING-FILE NAME |
|---|---|---|
| 1 | 001 | /etc/sysconfig/network-scripts/ifcfg-eth0 |
| 2 | 001 | /etc/sysconfig/network |

| id | INCIDENT ID | SETTING-FILE NAME | SETTING-ITEM NAME |
|---|---|---|---|
| 1 | 001 | /etc/sysconfig/network-scripts/ifcfg-eth0 | GATEWAY |
| 2 | 001 | /etc/sysconfig/network | HOSTNAME |

44

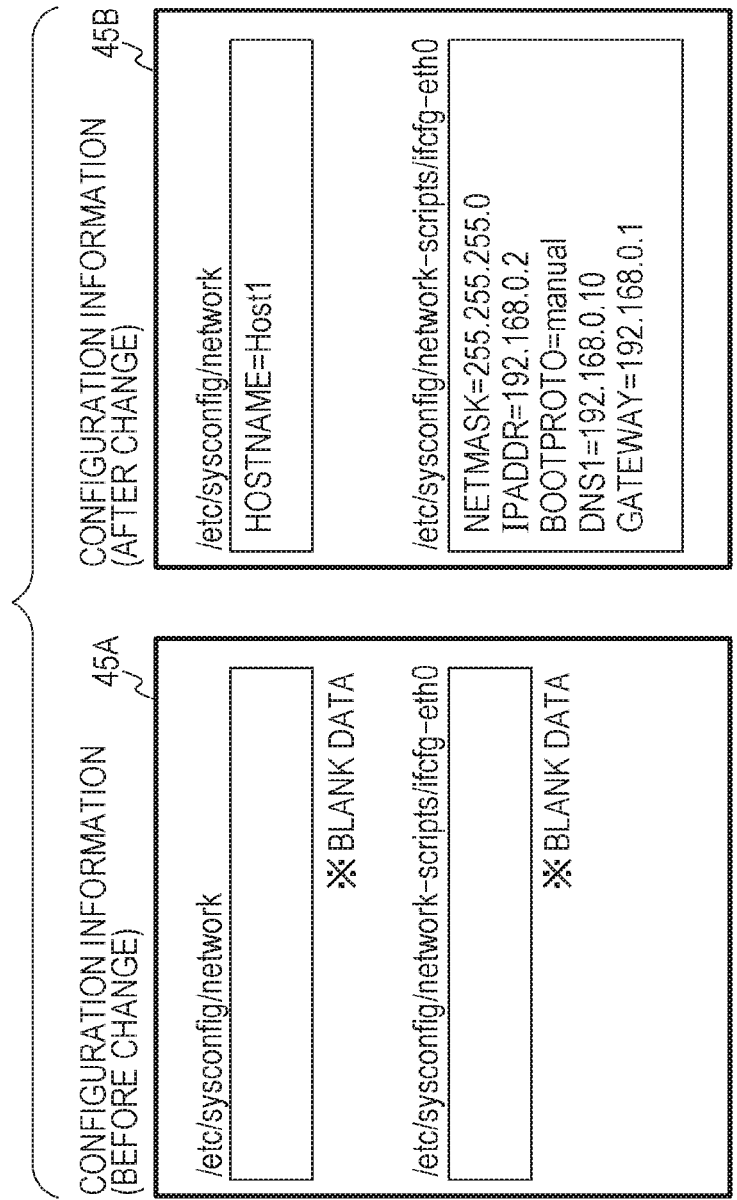

FIG. 11

| id | SETTING-FILE NAME | SETTING-ITEM NAME | BEFORE CHANGE | AFTER CHANGE | SCORE | RELEVANT INCIDENT ID |
|---|---|---|---|---|---|---|
| 1 | /etc/sysconfig/network | HOSTNAME | | Host1 | 0 | |
| 2 | /etc/sysconfig/network-scripts/ifcfg-eth0 | NETMASK | | 255.255.255.0 | 0 | |
| 3 | /etc/sysconfig/network-scripts/ifcfg-eth0 | IPADDR | | 192.168.0.2 | 0 | |
| 4 | /etc/sysconfig/network-scripts/ifcfg-eth0 | BOOTPROTO | | manual | 0 | |
| 5 | /etc/sysconfig/network-scripts/ifcfg-eth0 | DNS1 | | 192.168.0.10 | 0 | |
| 6 | /etc/sysconfig/network-scripts/ifcfg-eth0 | GATEWAY | | 192.168.0.1 | 0 | |
| ... | | | | | | |

| SETTING-FILE NAME | SETTING-ITEM NAME | BEFORE CHANGE | AFTER CHANGE | SCORE | RELEVANT INCIDENT ID |
|---|---|---|---|---|---|
| /etc/sysconfig/network-scripts/ifcfg-eth0 | GATEWAY | | 192.168.0.1 | 1 | 001 |
| /etc/sysconfig/network | HOSTNAME | | Host1 | 1 | 001 |
| /etc/sysconfig/network-scripts/ifcfg-eth0 | NETMASK | | 255.255.255.0 | 0 | — |
| /etc/sysconfig/network-scripts/ifcfg-eth0 | IPADDR | | 192.168.0.2 | 0 | — |
| /etc/sysconfig/network-scripts/ifcfg-eth0 | BOOTPROTO | | manual | 0 | — |
| /etc/sysconfig/network-scripts/ifcfg-eth0 | DNS1 | | 192.168.0.10 | 0 | — |
| ... | | | | | |

46

APPARATUS AND METHOD TO DETERMINE A SETTING ITEM CAUSING AN INCIDENT BASED ON ACTION RECORDS THEREFOR

CROSS-REFERENCE TO RELATED APPLICATION

This application is based upon and claims the benefit of priority of the prior Japanese Patent Application No. 2016-117017, filed on Jun. 13, 2016, the entire contents of which are incorporated herein by reference.

FIELD

The embodiment discussed herein is related to apparatus and method to determine a setting item causing an incident based action records therefor.

BACKGROUND

Heretofore, in systems including multiple apparatuses, apparatuses are monitored so that a significant failure does not occur. In addition, it is known that many system failures are caused by setting errors in a system configuration.

For example, when a system implemented by using different middleware products provided by a wide variety of different vendors performs a task involving the different middleware products, integrity of setting values of parameters is to be maintained among the middleware products. Accordingly, the following technique has been disclosed: one sentence is read from a sentence table in which multiple sentences, each of which describes a relationship between two parameters, are recorded; a pattern table including multiple patterns obtained through classification of sentences is referred to; and the sentence that has been read is compared with each pattern that is obtained through classification and that is stored in the pattern table. In the technique, a pattern for which similarity to the sentence that has been read is highest is determined. Among the records in a summary table in which relationships between two parameters are summarized, in a record corresponding to the pattern for which the similarity is highest, the count value for the relationship between two parameters which is indicated by the pattern is incremented. Thus, an event having a high probability of resulting in occurrence of a failure is inferred.

Widespread use of technique such as cloud causes multiple techniques to be combined for use with one another in a layered manner. Therefore, a combination of multiple factors may cause a failure in a system such that, when such a failure occurs, it becomes difficult to determine the reason for the failure.

To address this problem, there has been used a method in which information about failures that have occurred in the past and information about actions taken in response to the failures are recorded and analyzed.

For example, the following technique has been proposed. When a range in operation history in which classification of operation history is to be performed is given, pieces of operation history which correspond to the range are obtained from an operation history database (DB) storing operation history for operation target apparatuses which has been written in the past. In this technique, feature values are extracted from each piece of operation history, and the pieces of operation history are classified, for each of units causing failures, based on similarity of the feature values.

Japanese Laid-open Patent Publication No. 2015-232757 and Japanese Laid-open Patent Publication No. 2015-153078 are examples of the related art.

SUMMARY

According to an aspect of the invention, an apparatus obtains, for each of setting files, from a plurality of first action records, an occurrence count value that is associated with the each first action record and indicates a number of occurrences of a setting-item name identifying each of setting items of the each setting file, in association with a sequence number assigned to the each first action record, each of the plurality of first action records recording an action that is taken in response to a first incident occurring in the apparatus. When there exists a first setting file for which an occurrence pattern generated based on a sequence of occurrence count values that are each associated with different one of the sequence numbers assigned to the plurality of first action records for the first incident is similar to a model pattern that is in advance obtained from a plurality of second action records for second incidents occurring due to a setting error of a setting value that is set to the first setting file, the apparatus stores the first setting file in association with identification information of the first incident.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of incident information, according to an embodiment;

FIG. 4 is a diagram illustrating an example of a setting-item list, according to an embodiment;

FIG. 5 is a diagram illustrating an example of an occurrence count list, according to an embodiment;

FIG. 6 is a diagram illustrating an example of an occurrence pattern list, according to an embodiment;

FIG. 7 is a diagram illustrating an example of a model pattern list, according to an embodiment;

FIG. 8 is a diagram illustrating an example of a causal-file list, according to an embodiment;

FIG. 9 is a diagram illustrating an example of a causal-item list, according to an embodiment;

FIG. 10 is a diagram illustrating an example of configuration information, according to an embodiment;

FIG. 11 is a diagram illustrating an example of a changed-item list, according to an embodiment;

FIG. 12 is a diagram illustrating an example of an evaluation list, according to an embodiment;

DESCRIPTION OF EMBODIMENT

In change of a system configuration, the setting values of setting items in setting files which are set in the system are changed. At that time, setting errors of setting values cause an incident of the system. Typically, in incident information in which actions taken in response to an incident are recorded, specific setting items that have caused the incident are not recorded. Therefore, it is difficult to determine which change in settings may cause an incident occurring due to setting errors, from the recorded incident information.

It is desirable to associate an incident occurring due to setting errors with information about items causing the incident.

An exemplary embodiment according to the technique disclosed herein will be described in detail below with reference to the drawings.

Figure 1:
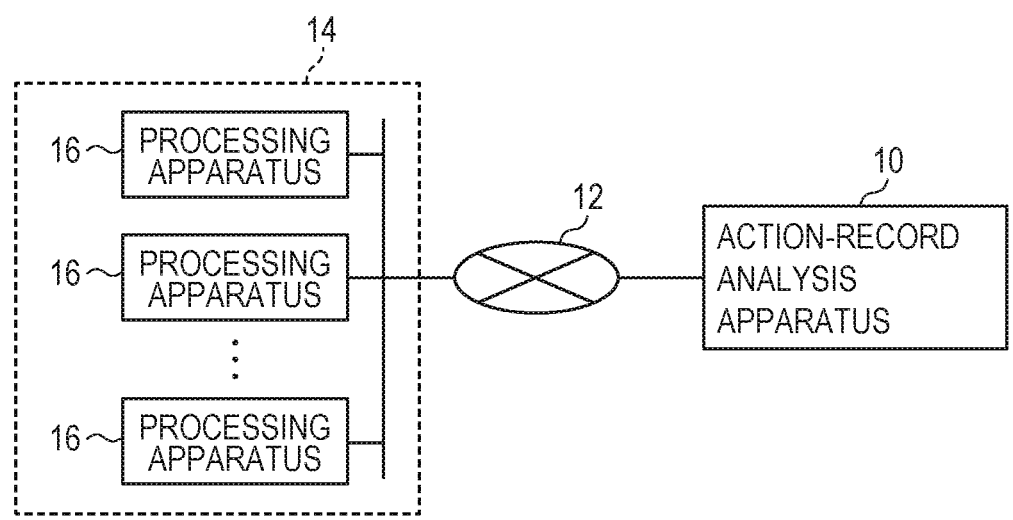
FIG. 1 is a diagram illustrating an example of a system configuration including a record analysis apparatus, according to an embodiment.

As illustrated in FIG. 1, an action-record analysis apparatus 10 according to the embodiment is coupled to a processing system 14 including multiple processing apparatuses 16, via a network 12 such as the Internet.

Figure 2:
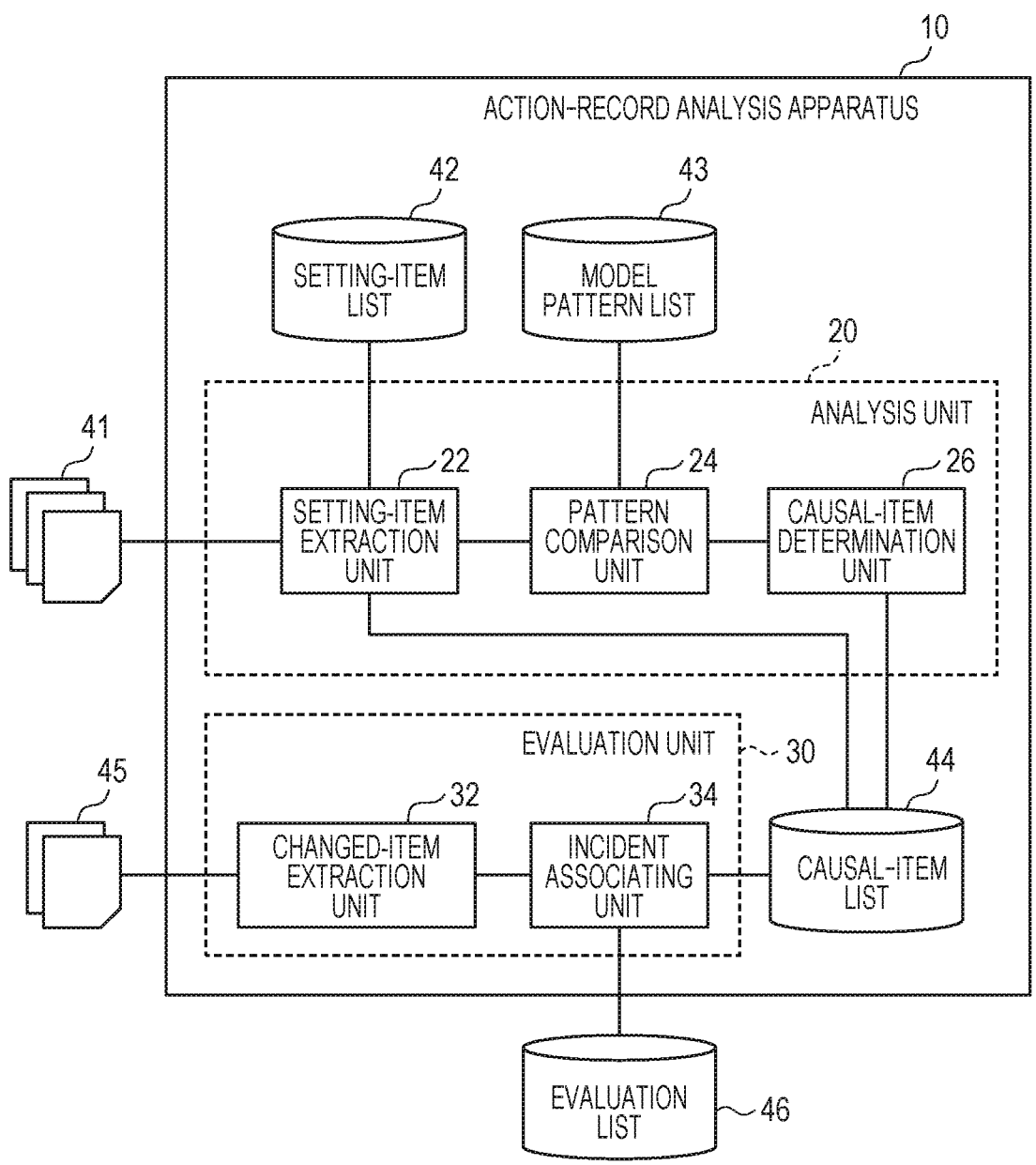
FIG. 2 is a diagram illustrating an example of a functional configuration of a record analysis apparatus, according to an embodiment.

FIG. 2 is a functional block diagram of the action-record analysis apparatus 10. The action-record analysis apparatus 10 includes an analysis unit 20 and an evaluation unit 30. The analysis unit 20 receives incident information 41 as input, determines setting files and setting items that may cause the incident occurring due to setting errors, and stores the determined information in a causal-item list 44. The evaluation unit 30 receives, as input, configuration information 45 before and after modification of setting items, and outputs an evaluation list 46 indicating an evaluation as to whether or not setting items for which setting values have been changed may cause incidents occurring due to setting errors. At that time, the evaluation unit 30 refers to the causal-item list 44 stored by the analysis unit 20. The analysis unit 20 and the evaluation unit 30 will be described in detail below.

The analysis unit 20 will be described. The analysis unit 20 includes a setting-item extraction unit 22, a pattern comparison unit 24, and a causal-item determination unit 26. The setting-item extraction unit 22 is an exemplary extraction unit provided in the technique disclosed herein. The pattern comparison unit 24 and the causal-item determination unit 26 are an exemplary analysis unit provided in the technique disclosed herein.

The setting-item extraction unit 22 extracts setting-item names described in a setting-item list 42, from the incident information 41 received by the action-record analysis apparatus 10, and counts occurrences of each of the setting-item names appearing in the incident information 41.

The incident information 41 describes actions taken in response to an incident occurring in a processing apparatus 16. FIG. 3 illustrates exemplary incident information 41. In the example in FIG. 3, the incident information 41 includes an incident identification (ID) 41A that is identification information of an incident. The incident information 41 also includes a plurality of action records 41B, in each of which information about an action in response to the incident is recorded for each of tasks. The plurality of action records 41B are provided with sequence numbers 41C that are determined chronologically according to when actions indicated by the plurality of action records 41B are taken. Examples of a task include reception of an inquiry through mail or the like, transfer of the inquiry to a relevant department, a reply to the inquiry, and modification of settings according to the reply, each of which is handled as a single task. An action record 41B contains information described in the mail or the like, information about a task performed by a person in charge, or the like.

The setting-item list 42 is a list for describing setting items included in all of the setting files that may be set in the processing apparatuses 16. FIG. 4 illustrates an exemplary setting-item list 42. In the example in FIG. 4, each record (each row) corresponds to a single setting item. Each record includes an "id" that is identification information of the record, a "setting-item name", and the "setting-file name" of a setting file including the setting-item indicated by the setting-item name. In the embodiment, a sequence number starting from 1 is given, as "id", to each action record. The same is true for the other lists described below. In this example, it is assumed that configuration information including setting files describing settings for hardware and software included in the processing apparatuses 16 is data in a directory structure. A path from the root directory to a setting file is used as a setting-file name.

Specifically, from the incident information 41 including any of the setting-file names described in the setting-item list 42, the setting-item extraction unit 22 extracts a setting-item name described in association with the setting-file name in the setting-item list 42. In extraction of a setting-item name from the incident information 41, for example, a known method of the related art, such as matching using a regular expression or the like which is performed on the incident information 41 described in a natural language, may be used.

The setting-item extraction unit 22 counts occurrences of the extracted setting-item name, for each sequence number 41C of the plurality of action records 41B, and stores the obtained count value in an occurrence count list. FIG. 5 illustrates an exemplary occurrence count list 51. In the example in FIG. 5, each record (each row) stores the occurrence counts of a single setting-item name, each of which is obtained for a corresponding one of the sequence numbers. Each record includes an "id" that is identification information of the record, a "setting-file name" and a "setting-item name", the "incident ID" of the incident information 41 from which the setting-item name is extracted, and occurrence counts, each of which is obtained for a corresponding one of the sequence numbers. In the example in FIG. 5, a case in which an occurrence count for each sequence number is stored in a column corresponding to the sequence number is illustrated. For example, the occurrence counts, each of which is obtained for a corresponding one of the sequence numbers, may be stored in an array format such as {1, 0, . . . , 0, 4} in a single column. The setting-item extraction unit 22 outputs the stored occurrence count list 51 to the pattern comparison unit 24.

The pattern comparison unit 24 creates an occurrence pattern for each setting file based on the occurrence count list 51 that has been output from the setting-item extraction unit 22, and compares the created occurrence pattern with a model pattern that is created in advance from incident information for incidents occurring due to errors in setting of setting items. When the occurrence pattern is similar to the model pattern, the pattern comparison unit 24 determines the setting file corresponding to the occurrence pattern to be a setting file including setting items that may cause the incident occurring due to setting errors.

The reason why an occurrence pattern determined based on the occurrence count list 51, that is, an occurrence pattern determined based on occurrence counts of setting-item names, each of which is obtained for a corresponding one of the sequence numbers, is used in determination of setting files that may cause the incident occurring due to setting errors will be described.

Attention is focused on a fact that, when an incident occurs due to setting errors, the occurrence pattern of occurrences of setting-item names in the action record 41B for the incident has certain characteristics. For example, in many cases, the current setting values of the setting items in all of the setting files may be described as basic information in the first inquiry transmitted when an incident occurs. That is, regardless of whether or not setting items cause the incident, many setting-item names are highly likely to be included in an action record 41B having a low sequence number. In an action in the final stage, in many cases, information about setting-item names for which the setting values are to be modified may be transmitted as a reply to the inquiry source. That is, setting-item names of the setting-items that may cause the incident are highly likely to be included in an action record 41B having a high sequence number.

Therefore, based on characteristics of an occurrence pattern of setting-item names which is obtained for each setting file from a plurality of action records, it may be determined whether or not setting items included in the setting file may cause the incident occurring due to setting errors. The above-described characteristics of an occurrence pattern of setting-item names in the plurality of action records are merely an example. An occurrence pattern may have other characteristics in accordance with a description format of the action records, a troubleshooting manual, or the like.

For example, the pattern comparison unit 24 calculates an element value $\gamma_{i,m}$ that corresponds to sequence number m within an occurrence pattern of a setting file i, based on the occurrence count list 51. The pattern comparison unit 24 generates an occurrence pattern in which the mth element is $\gamma_{i,m}$, for the setting file i. That is, a sequence in which values $\gamma_{i,m}$ are arrayed in ascending order of the sequence number m is an occurrence pattern of the setting file i.

For example, the pattern comparison unit 24 obtains a mode value n, for the setting file i and sequence number m, of the occurrence counts of the setting-item names, and calculates, as $\gamma_{i,m}$, a ratio of the number of setting-item names whose occurrence count is not n, to the number of all of the setting-item names. An example, in which a ratio ($\gamma_{i,m}$) for sequence number 10 and setting file i of "/etc/sysconfig/network-scripts/ifcfg-eth0" is calculated by using the occurrence count list 51 illustrated in FIG. 5, will be described. In this case, the pattern comparison unit 24 uses the occurrence counts enclosed with a dashed line in FIG. 5, so as to obtain the mode value n, which is equal to 2, of the occurrence counts for sequence number 10. There is only one setting-item name "GATEWAY" for which the occurrence count is not 2. The number of all of the setting-item names included in the setting file i is 5. Therefore, the pattern comparison unit 24 calculates $\gamma_{i,10}$ as 1/5=0.2. For the other sequence numbers, $\gamma_{i,m}$ may be similarly calculated. Accordingly, for example, an occurrence pattern of {0, 0, 0, 0, 0, 0, 0, 0, 0, 0.2} is created.

As another method for calculating $\gamma_{i,m}$, a value obtained by multiplying $\gamma_{i,m}$ described above by the average of the occurrence counts for the sequence number m may be calculated as $\gamma_{i,m}$. For example, in an example similar to the above-described case, the pattern comparison unit 24 uses the occurrence counts of the setting-item names enclosed with the dashed line in FIG. 5, so as to calculate an average of occurrence counts for sequence number 10 as (4+2+2+2+2)/5=2.4. The pattern comparison unit 24 multiplies the above-described ratio by the average to calculate $\gamma_{i,10}$ as 0.2×2.4=0.48.

The value of each element in an occurrence pattern is calculated as described above, thereby generating an occurrence pattern, in which a sequence number for which, for example, all of the setting-items included in a setting file appear is regarded as a noise and is excluded, may be created. A method for generating an occurrence pattern is not limited to the above-described example. A generation method, in which an occurrence pattern of setting-item names appearing in the action record 41B is taken into account, may be employed.

The pattern comparison unit 24 stores the generated occurrence pattern of each setting file in an occurrence pattern list 52. FIG. 6 illustrates an exemplary occurrence pattern list 52. In the example in FIG. 6, each record (each row) corresponds to an occurrence pattern of a corresponding one of the setting files. Each record includes an "id" that is identification information of the record, a "setting-file name", an "occurrence pattern" for the setting file, and the "incident ID" of the incident information 41 used in generation of the occurrence pattern.

A model pattern is generated by using a method similar to the above-described method, from incident information for the incidents known to occur due to setting errors. FIG. 7 illustrates an exemplary model pattern list 43 in which a model pattern for each setting file is registered.

The pattern comparison unit 24 compares an occurrence pattern of each setting file which is stored in the occurrence pattern list 52, with a model pattern that corresponds to a setting file that is registered in the model pattern list 43 and identical to the each setting file for the occurrence pattern, and calculates a similarity between them. As similarity, known similarity of the related art, such as the root mean square or the cosine similarity, may be used. For example, it is assumed that an occurrence pattern $P_i$ of the setting file "/etc/sysconfig/network-scripts/ifcfg-eth0" is {0, 0, 0, 0, 0, 0, 0, 0, 0, 0.2}. In addition, it is assumed that a model pattern $P_k$ of the same setting file is {0.1, 0, 0, 0, 0, 0, 0, 0, 0, 0.25}. When the root mean square is used as similarity, the similarity $S_{i,k}$ between the occurrence pattern $P_i$ and the model pattern $P_k = \sqrt{((0.1-0)^2+(0.25-0.2)^2)}=0.1118$.

The pattern comparison unit 24 compares the similarity between an occurrence pattern and a model pattern, with a predetermined threshold. When the occurrence pattern is similar to the model pattern, the pattern comparison unit 24 determines the setting file corresponding to the occurrence pattern to be a setting file that may cause an incident occurring due to setting errors, and stores the setting-file name in a causal-file list. Hereinafter, a setting file that may cause an incident occurring due to setting errors is referred to as a "causal file". In the above-described example, under the assumption that a threshold $T_S$ with which the similarity $S_{i,k}$ is compared is 0.2, $S_{i,k} < T_S$ because $S_{i,k} = 0.1118$ and $T_S = 0.2$. Therefore, it is determined that the occurrence pattern $P_i$ is similar to the model pattern $P_k$.

FIG. 8 illustrates an exemplary causal-file list 53. In the example in FIG. 8, each record (each row) corresponds to a single causal file. Each record includes an "id" that is identification information of the record, the "setting-file name" of a causal file, and the "incident ID" of the incident information 41 used in generation of the occurrence pattern of the causal file. The pattern comparison unit 24 outputs the stored causal-file list 53 to the causal-item determination unit 26.

For each of the setting-file names stored in the causal-file list 53 that is output from the pattern comparison unit 24, the causal-item determination unit 26 determines setting items that may cause the incident occurring due to setting errors, among the setting items included in the setting file indicated by the setting-file name. Hereinafter, a setting-item that may cause an incident occurring due to setting errors is referred to as a "causal item".

Specifically, the causal-item determination unit 26 refers to the occurrence count list 51 that is output from the setting-item extraction unit 22, and determines causal items for each setting file, based on occurrence counts of setting-item names appearing for a certain sequence number. The certain sequence number may be, for example, a sequence number for which the total of occurrence counts of the setting-item names is largest among the sequence numbers for which setting-item names are extracted, or the highest sequence number (the last sequence number for which the setting-item names appear) among the sequence numbers for which setting-item names are extracted. The causal-item determination unit 26 determines setting items indicated by setting-item names that characteristically appear for the certain sequence number, to be the causal items.

For example, the causal-item determination unit 26 obtains the mode value n of occurrence counts for the certain sequence number. When the number of setting items for which the occurrence counts are n is smaller than a predetermined threshold, the causal-item determination unit 26 determines all of the setting items of the setting file which are included in the occurrence count list 51, to be causal items. When the number of setting items for which the occurrence counts are n is equal to or greater than the predetermined threshold, the causal-item determination unit 26 determines the setting items for which the occurrence counts are not n, to be causal items.

In the example in FIG. 5, an exemplary case in which causal items are determined from the setting items of the setting file "/etc/sysconfig/network" will be described. It is assumed that a threshold $T_v$ which is compared with the number of setting items for which the occurrence counts are equal to the mode value n is 2, and that the certain sequence number is set at sequence number 10. In this case, the number of occurrences of the mode value n (n=1)<the threshold $T_v$ because the number of occurrences of the mode value=1 and $T_v = 2$. Therefore, the causal-item determination unit 26 determines all of the setting items of the setting file "/etc/sysconfig/network" which are included in the occurrence count list 51, to be causal items. In this example, "HOSTNAME" is determined to be a causal item (a portion enclosed with a dot-dashed line in FIG. 5).

Similarly, a case for the setting file "/etc/sysconfig/network-scripts/ifcfg-eth0" will be described by using the example in FIG. 5. In this case, the number of occurrences of the mode value n (n=2)>the threshold $T_v$ because the number of occurrences of the mode value=4 and $T_v = 2$. Therefore, the causal-item determination unit 26 determines the setting-item "GATEWAY" for which the occurrence count is not the mode value n (n=2), among the setting items of the setting file which are included in the occurrence count list 51, to be a causal item (a portion enclosed with a dot-dot-dashed line in FIG. 5).

The causal-item determination unit 26 stores the determined causal items in the causal-item list 44. FIG. 9 illustrates an exemplary causal-item list 44. In the example in FIG. 9, each record (each row) corresponds to a single causal item. Each record includes an "id" that is identification information of the record, the "setting-item name" of a causal item, the "setting-file name" of the setting file including the setting-item indicated by the setting-item name, and the "incident ID" of the incident information 41 from which the causal item is extracted.

As another method for determining causal items, a determination method, in which setting items indicated by setting-item names included in an action record 41B having a higher sequence number, that is, an action record 41B that describes an action in the final stage are regarded as being more likely to be causal items, will be described.

Assume that the setting items of a setting file of interest are represented by $P = \{p_1, p_2, \ldots\}$, and that a score indicating probability that a setting-item p is a causal item is represented by $S(p)$. Then, the score $S(p)$ is expressed by using Expression (1) described below.

$$S(p) = \sum_{i: i \neq 1} \frac{i'_{max}(p)}{i_{max}} \quad (1)$$

In Expression (1), $i_{max}$ represents the highest sequence number, and $i'_{max}(p)$ is expressed by using Expression (2) as described below. In Expression (1) described above, it is assumed that, in the action record 41B indicated by sequence number 1, all of the setting items appear regardless of whether or not the setting items are causal items. Accordingly, sequence number 1 is excluded in the calculation.

$$i'_{max}(p) = \max_i i * 1(i, p) \quad (2)$$

$$\therefore 1(i, p) = \begin{cases} 0, & \text{if } \min_{q \in P} \text{count}(i, q) = \text{count}(i, p) \text{ and } |P| \geq 2 \\ 1, & \text{else} \end{cases}$$

In Expression (2), count(i, p) represents the number of occurrences, in the action record 41B for the sequence number i, of the setting-item name indicating the setting-item p.

When the score $S(p)$ of the setting-item p which is calculated by using Expression (1) described above is larger than a predetermined threshold, the causal-item determination unit 26 determines the setting-item p to be a causal item. For example, when the occurrence count list 51 in FIG. 5 is used to calculate the score $S(p)$ of the setting-item "GATEWAY" of the setting file "/etc/sysconfig/network-scripts/ifcfg-eth0", $S(p) = 10/10 = 1$. If the threshold is 0.5, since the score $S(p)$ (=1)>0.5, the setting-item "GATEWAY" is determined to be a causal item.

The evaluation unit 30 will be described. The evaluation unit 30 further includes a changed-item extraction unit 32 and an incident associating unit 34. The incident associating unit 34 is an example of an output unit provided in the technique disclosed herein.

When a processing apparatus 16 changes the setting values of setting items of any setting file, the changed-item extraction unit 32 obtains the configuration information 45 before and after change of the setting values, and extracts the setting-file name and the setting-item names of the setting file and the setting items for which the setting values have been changed. FIG. 10 illustrates exemplary configuration information 45. FIG. 10 illustrates an example of configuration information 45A before change of setting values on the left side, and an example of configuration information 45B after change of the setting values on the right side. FIG. 10 schematically illustrates only parts of setting files in which the setting values have been changed, in the configuration information.

The changed-item extraction unit 32, for example, obtains a difference between the configuration information 45A before change and the configuration information 45B after change, and extracts the setting-file names and the setting-item names of the setting files and the setting items for which setting values have been changed. Further, the changed-item extraction unit 32 extracts the setting values before and after the change. The changed-item extraction unit 32 stores, in a changed-item list 54, the extracted setting-file names and setting-item names, and the setting values before and after change. FIG. 11 illustrates an example of a changed-item list 54. In the example in FIG. 11, each record (each row) corresponds to a single setting-item for which the setting value has been changed. Each record includes an "id" that is identification information of the record, extracted "setting-file name" and "setting-item name", and "before change" and "after change" that are setting values before and after change. The changed-item list 54 also includes a "score" and a "relevant incident ID" that will be described in detail below. The initial value of the "score" field is 0, and the initial state of the "relevant incident ID" field is blank.

The incident associating unit 34 associates each record stored in the changed-item list 54, with causal items stored in the causal-item list 44.

For example, the incident associating unit 34 searches the causal-item list 44 for a record including a setting-file name and a setting-item name that match the setting-file name and the setting-item name included in each record in the changed-item list 54. The incident associating unit 34 stores the incident ID in the retrieved record, in the "relevant incident ID" field of the record in the changed-item list 54. When multiple records are retrieved, the incident associating unit 34 stores all of the incident IDs in the records. Further, the incident associating unit 34 adds the number of incident IDs stored in the "relevant incident ID" field, in the "score" field of the record in the changed-item list 54. That is, the "score" of each record in the changed-item list 54 has a larger value when the number of associated incident IDs is larger.

When the incident associating unit 34 has performed an operation for association with causal items, on all of the records included in the changed-item list 54, the incident associating unit 34 creates the evaluation list 46 obtained by sorting the records in the changed-item list 54 in descending order of the score, and outputs the created evaluation list 46. FIG. 12 illustrates an example of an evaluation list 46. The evaluation list 46 in which changed items are described in accordance with the rankings determined by sorting the changed items based on the score is output so that it is possible to preferentially check setting items that have a high probability of causal incidents occurring due to setting errors. In particular, when there are many setting items for which the setting values have been changed, that is, for example, when there are a large number of records in the evaluation list 46, it is possible to easily grasp and check setting items that have a high probability of causing incidents occurring due to setting errors.

When the changed-item list 54 includes many records having the same score, the incident associating unit 34 may set the ranking of a record, for which a troubleshooting time for the incident is longer, at a higher value in the evaluation list 46. The reason is as follows. The longer the time for troubleshooting is, the more significant the adverse effect produced when the incident occurs is. Therefore, more attention is to be directed toward such a record in the evaluation list 46.

For example, the incident information 41 includes a troubleshooting time from the beginning of the troubleshooting for the incident to the end. The incident associating unit 34 sorts records in accordance with the troubleshooting time that is included in the incident information 41 and that corresponds to the incident ID stored in the "relevant incident ID" field in the changed-item list 54, and creates the evaluation list 46.

When there are multiple records having the same score in the changed-item list 54, the incident associating unit 34 may set the ranking of a record in such a manner that, when the record is associated with more incidents of the same type, the ranking of the record is set at a higher value in the evaluation list 46. This is because, when the frequency of occurrences of incidents of the same type is high, more attention is to be directed toward such a record in the evaluation list 46.

For example, the incident information 41 includes information about the type of the incident. The incident associating unit 34 classifies the incident IDs stored in the "relevant incident ID" in accordance with the incident types included in the pieces of incident information 41 corresponding to the incident IDs. The incident associating unit 34 sets, at a higher value, the ranking of a record that has a classification group including classified incident IDs, the number of which is larger than those in the other classification groups of the record and those in the classification groups of the other records.

For example, it is assumed that the types of incidents whose incident IDs are 001, 002, and 003 are the type A; the type of an incident whose incident ID is 104 is the type B; and the type of an incident whose incident ID is 205 is the type C. In the "relevant incident ID" field of a record X in the changed-item list 54, 001, 002, and 003 are stored, and, in the "relevant incident ID" field of a record Y, 001, 104, and 205 are stored. In this case, a score corresponding to the number of relevant incident IDs is "3" for both of the record X and the record Y. In contrast, all of the relevant incident IDs in the record X are classified into the same type A, while the relevant incident IDs of the record Y are classified into the types A, B, and C. Therefore, the maximum number of classified incident IDs among the classification groups is 3 for the record X, and is 1 for the record Y. Therefore, the record X is given a higher ranking.

Figure 13:
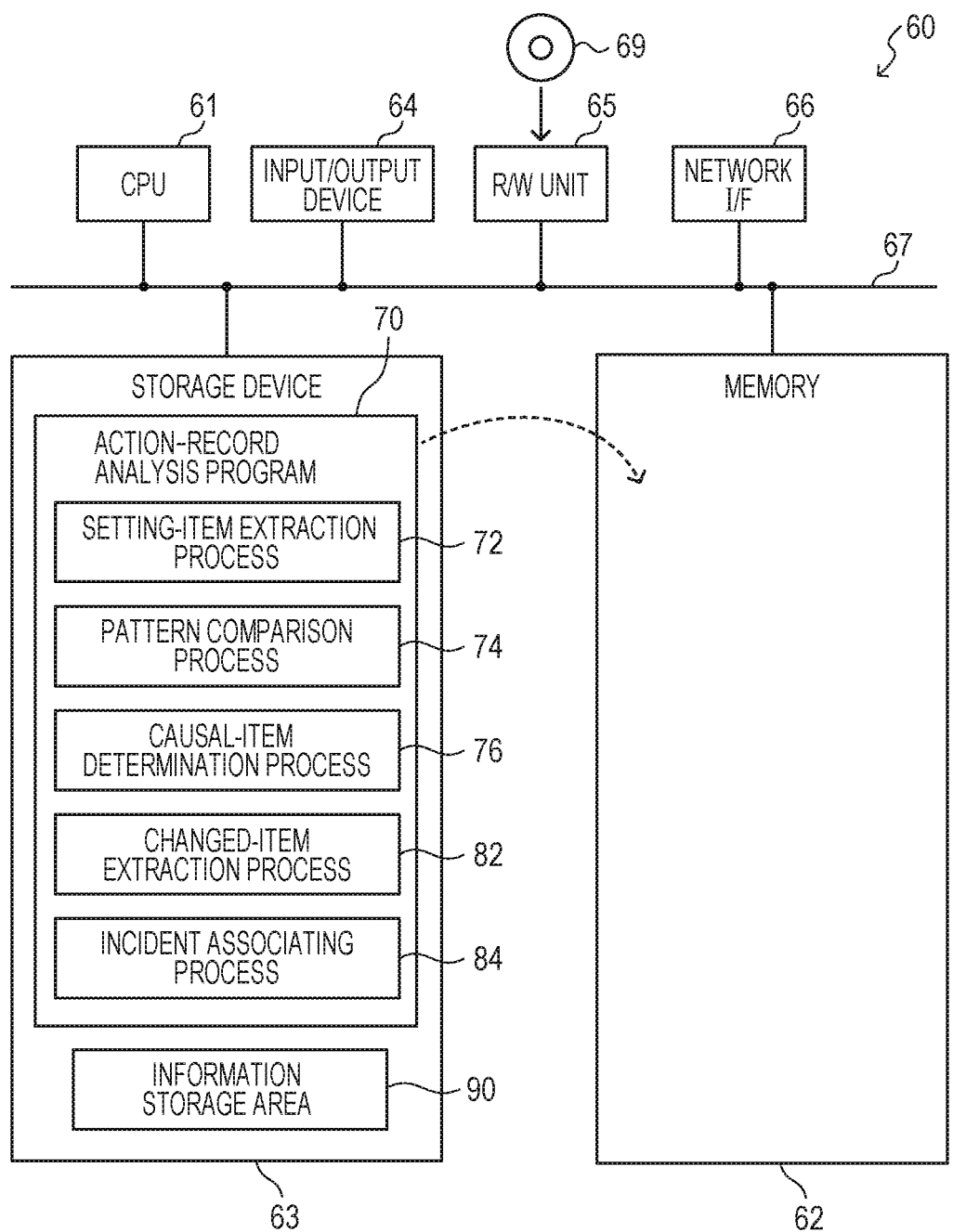
FIG. 13 is a diagram illustrating an example of a configuration of a computer functioning as a record analysis apparatus, according to an embodiment.

The action-record analysis apparatus 10 may be implemented, for example, by using a computer 60 illustrated in FIG. 13. The computer 60 includes a central processing unit (CPU) 61, a memory 62 serving as a temporary storage area, and a nonvolatile storage device 63. The computer 60 also includes an input/output device 64, a read/write (R/W) unit 65 that controls reading and writing of data on a recording medium 69, and a network I/F 66 that is coupled to the network 12 such as the Internet. The CPU 61, the memory 62, the storage device 63, the input/output device 64, the R/W unit 65, and the network I/F 66 are coupled to one another via a bus 67.

The storage device 63 may be implemented by using a hard disk drive (HDD), a solid state drive (SSD), a flash memory, or the like. The storage device 63 as a storage medium stores an action record analysis program 70 for causing the computer 60 to function as the action record analysis apparatus 10. The action-record analysis program 70 includes a setting-item extraction process 72, a pattern comparison process 74, a causal-item determination process 76, a changed-item extraction process 82, and an incident associating process 84. The storage device 63 includes an information storage area 90 in which information constituting various lists is stored.

The CPU 61 reads the action-record analysis program 70 from the storage device 63, loads the action-record analysis program 70 on the memory 62, and sequentially performs the processes included in the action-record analysis program 70. The CPU 61 performs the setting-item extraction process 72 so as to act as the setting-item extraction unit 22 illustrated in FIG. 2. The CPU 61 performs the pattern comparison process 74 so as to act as the pattern comparison unit 24 illustrated in FIG. 2. The CPU 61 performs the causal-item determination process 76 so as to act as the causal-item determination unit 26 illustrated in FIG. 2. The CPU 61 performs the changed-item extraction process 82 so as to act as the changed-item extraction unit 32 illustrated in FIG. 2. The CPU 61 performs the incident associating process 84 so as to act as the incident associating unit 34 illustrated in FIG. 2. The CPU 61 reads information stored in the information storage area 90, and loads the information as the various lists on the memory 62. Thus, the computer 60 that executes the action-record analysis program 70 functions as the action-record analysis apparatus 10.

The functions implemented by the action-record analysis program 70 may be implemented, for example, by using a semiconductor integrated circuit, more specifically, an application specific integrated circuit (ASIC) or the like.

Operations performed by the action-record analysis apparatus 10 according to the embodiment will be described. When the action-record analysis apparatus 10 receives the incident information 41 stored when an incident has occurred, the action-record analysis apparatus 10 performs an analysis process illustrated in FIG. 14. In a state in which the causal-item list 44 is stored in a predetermined storage area through the analysis process, when the action-record analysis apparatus 10 receives the configuration information 45 before and after change of setting values, the action-record analysis apparatus 10 performs an evaluation process illustrated in FIG. 19, and outputs the evaluation list 46. The analysis process and the evaluation process performed by the action-record analysis apparatus 10 are examples of an action-record analysis method provided in the technique disclosed herein. Each of the processes will be described below.

The analysis process illustrated in FIG. 14 will be described. In step S10 in the analysis process, a setting-item extraction process of which the details are illustrated in FIG. 15 is performed.

Figure 15:
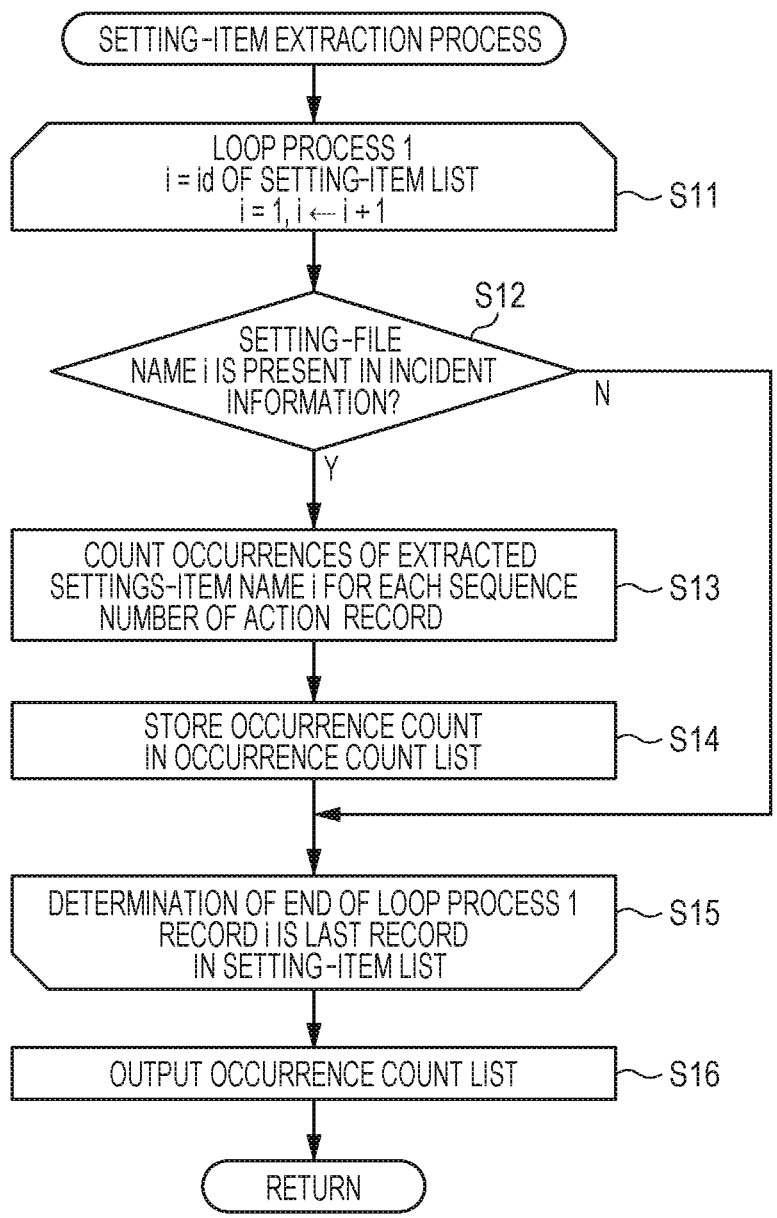
FIG. 15 is a diagram illustrating an example of an operational flowchart for a setting-item extraction process, according to an embodiment.

In step S11 of the setting-item extraction process illustrated in FIG. 15, the setting-item extraction unit 22 performs loop process 1. In loop process 1, the setting-item extraction unit 22 sets, at 1, the initial value of a variable i corresponding to the id of the setting-item list 42. While incrementing i by 1, the setting-item extraction unit 22 performs the processes in steps S12 to S14.

In step S12, the setting-item extraction unit 22 determines whether or not the "setting-file name" included in a record with id i within the setting-item list 42 is present in the received incident information 41. In the description below, an "item Y" included in a record with id i which is included in the various lists is denoted as an item Yi. When the setting-file name i of the setting-item list 42 is present in the incident information 41, the process proceeds to step S13. When the setting-file name i is not present, the process proceeds to step S15.

In step S13, the setting-item extraction unit 22 extracts the setting-item name i from the incident information 41, and counts occurrences of the extracted setting-item name which are obtained for each sequence number 41C of the action record 41B. In step S14, the setting-item extraction unit 22 stores the occurrence count obtained in step S13 described above in the occurrence count list 51, for example, as illustrated in FIG. 5.

In step S15, the setting-item extraction unit 22 determines whether or not the record whose id is i is the last record in the setting-item list 42, as determination of the end of loop process 1. When the record whose id is i is not the last record in the setting-item list 42, loop process 1 is repeated. When the record is the last record, loop process 1 is ended, and the process proceeds to step S16.

Figure 14:
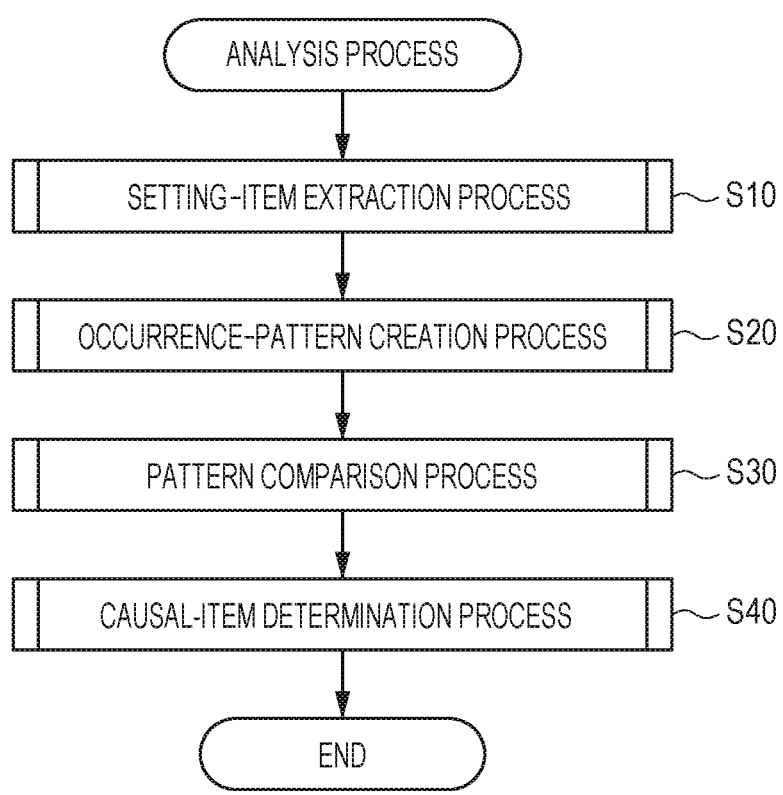
FIG. 14 is a diagram illustrating an example of an operational flowchart for an analysis process, according to an embodiment.

In step S16, the setting-item extraction unit 22 outputs the occurrence count list 51 obtained in the storing operation in step S14 described above, to the pattern comparison unit 24, and the process returns back to the analysis process illustrated in FIG. 14.

Figure 16:
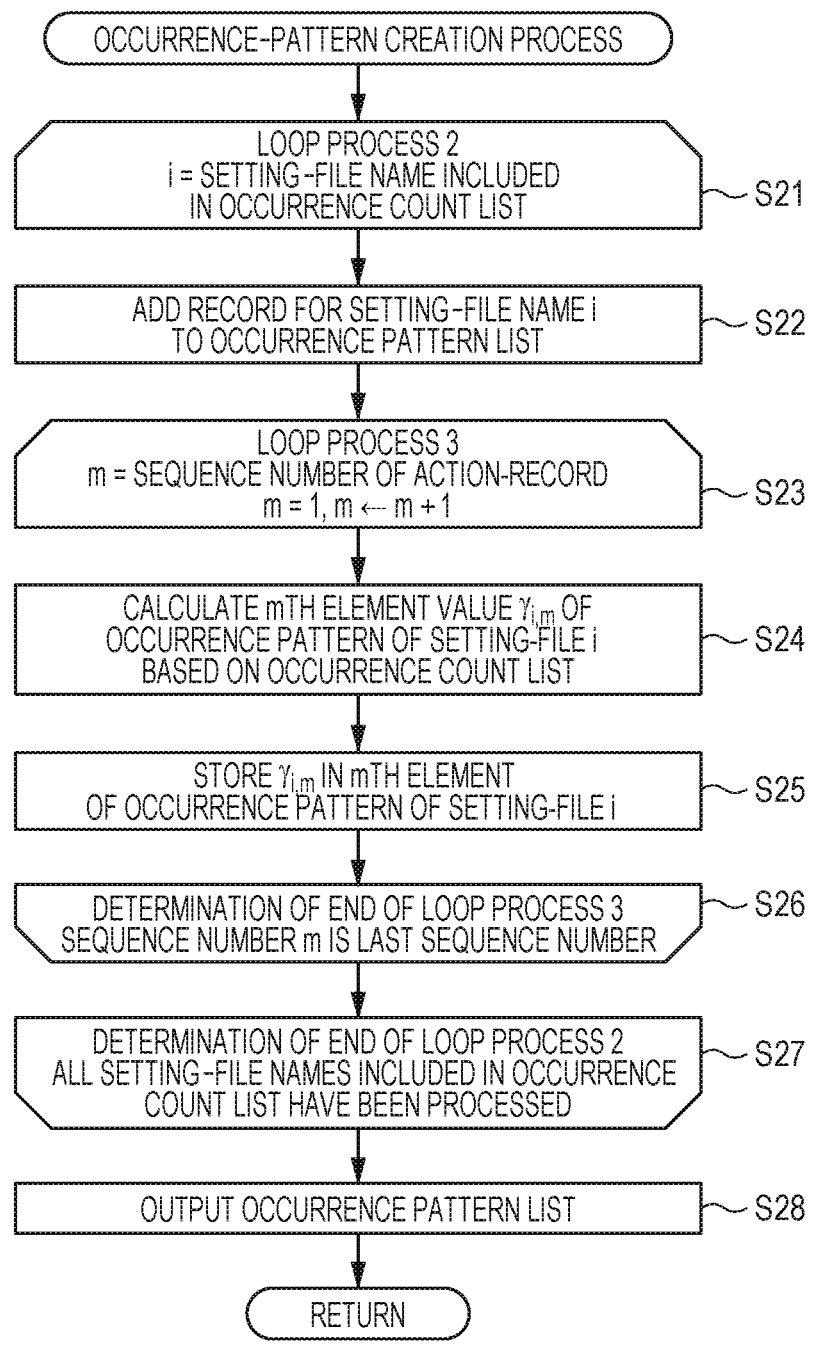
FIG. 16 is a diagram illustrating an example of an operational flowchart for an occurrence-pattern creation process, according to an embodiment.

Then, in step S20 in the analysis process, an occurrence-pattern creation process of which the details are illustrated in FIG. 16 is performed.

In step S21 in the occurrence-pattern creation process illustrated in FIG. 16, the pattern comparison unit 24 performs loop process 2. In loop process 2, the pattern comparison unit 24 sets the setting-file names included in the occurrence count list 51, to i one by one, and performs the process in step S22 and loop process 3 in step S23.

In step S22, the pattern comparison unit 24 adds a record for the setting-file name i to the occurrence pattern list 52, for example, as illustrated in FIG. 6. The pattern comparison unit 24 sets the record so that the record includes the setting-file name i and the incident ID corresponding to the setting file i of the occurrence count list 51, and provides an id to the record. The pattern comparison unit 24 sets, in the "occurrence pattern" field, an empty array which may store elements, the number of which is equal to the number of sequence numbers for the action records 41B in the incident information 41.

In step S23, the pattern comparison unit 24 performs loop process 3. In loop process 3, the pattern comparison unit 24 sets, at 1, the initial value of a variable m corresponding to the sequence number 41C of the action record 41B. While incrementing m by 1, the pattern comparison unit 24 performs the processes in steps S24 to S25.

In step S24, the pattern comparison unit 24 calculates the element value $\gamma_{i,m}$ corresponding to the sequence number m of the occurrence pattern for the setting file i, based on the occurrence count list 51. As described above, for example, the pattern comparison unit 24 obtains the mode value n of the occurrence counts of the setting-item names of the setting file i for the sequence number m, and calculates, as $\gamma_{i,m}$, a ratio of the number of setting-item names for which the occurrence count is not n, to the number of all of the setting-item names. The pattern comparison unit 24 may calculate, as $\gamma_{i,m}$, a value obtained by multiplying the average of the occurrence counts for each sequence number by the above-described ratio.

In step S25, the pattern comparison unit 24 stores $\gamma_{i,m}$ calculated in step S24 described above, in the mth element of the occurrence pattern of the setting file i, which is set in the "occurrence pattern" field in the record, of the occurrence pattern list 52, including the setting-file name i.

In step S26, the pattern comparison unit 24 determines whether or not the sequence number m is the last sequence number (the highest sequence number), as determination of the end of loop process 3. When the sequence number m is not the last sequence number, loop process 3 is repeated. When the sequence number m is the last sequence number, loop process 3 is ended. In the stage in which loop process 3 for the setting-file name i is ended, an occurrence pattern such as {0, 0, 0, 0, 0, 0, 0, 0, 0, 0.2} has been created for the setting-file name i.

In step S27, the pattern comparison unit 24 determines whether or not all of the setting-file names included in the occurrence count list 51 have been set to i so as to be subjected to loop process 2, as determination of the end of loop process 2. When a setting-file name that has not been subjected to loop process 2 is present, the setting-file name is set to i, and loop process 2 is repeated. When all of the setting-file names have been subjected to loop process 2, loop process 2 is ended, and the process proceeds to step S28 which is the next step.

In step S28, the pattern comparison unit 24 outputs the occurrence pattern list 52 storing the occurrence pattern for each of the setting-file names included in the occurrence count list 51, and the process returns back to the analysis process illustrated in FIG. 14.

Figure 17:
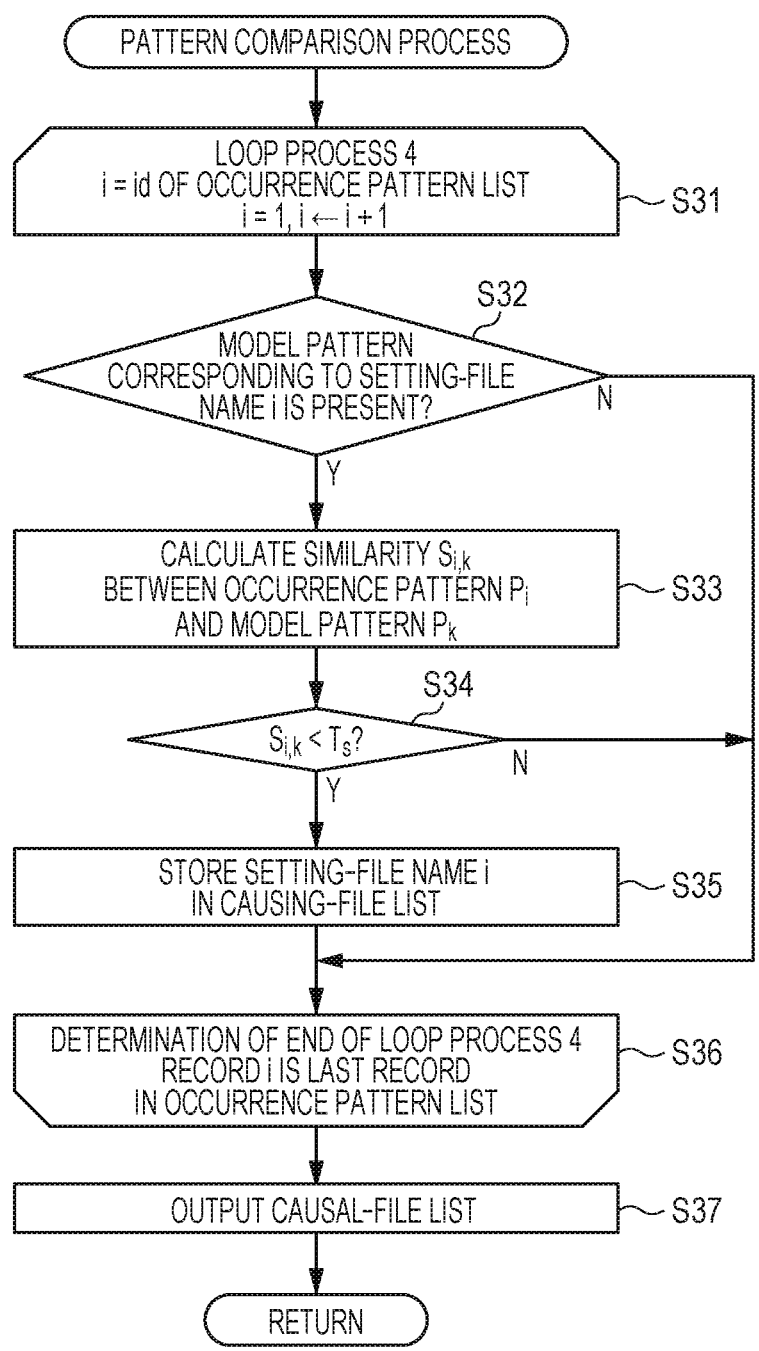
FIG. 17 is a diagram illustrating an example of an operational flowchart for a pattern comparison process, according to an embodiment.

In step S30 in the analysis process, a pattern comparison process of which the details are illustrated in FIG. 17 is performed.

In step S31 of the pattern comparison process illustrated in FIG. 17, the pattern comparison unit 24 performs loop process 4. In loop process 4, the pattern comparison unit 24 sets 1 to the initial value of a variable i corresponding to the id of the occurrence pattern list 52. While incrementing i by 1, the pattern comparison unit 24 performs the processes in steps S32 to S35.

In step S32, the pattern comparison unit 24 determines whether or not a model pattern associated with a setting-file name matching the setting-file name i of the occurrence pattern list 52 is present in the model pattern list 43. When a model pattern corresponding to the setting-file name i is present, the process proceeds to step S33. When such a model pattern is not present, the process proceeds to step S36.

In step S33, the pattern comparison unit 24 calculates a similarity $S_{i,k}$ between the occurrence pattern $P_i$ of the occurrence pattern list 52 and the model pattern $P_k$, where $P_k$ is the model pattern corresponding to the setting-file name i. The root mean square is used as similarity $S_{i,k}$.

In step S34, the pattern comparison unit 24 compares the similarity $S_{i,k}$ calculated in step S33 described above with a predetermined threshold $T_S$ so as to determine whether or not the occurrence pattern $P_i$ is similar to the model pattern $P_k$. In this example, the root mean square is used as similarity $S_{i,k}$. Therefore, when the similarity $S_{i,k}$ is less than the threshold $T_S$, it is determined that the occurrence pattern $P_i$ is similar to the model pattern $P_k$. The process proceeds to step S35 when $S_{i,k} \geq T_S$, and the process proceeds to step S36 when $S_{i,k} < T_S$.

In step S35, the pattern comparison unit 24 adds the incident ID i and the setting-file name i of the occurrence pattern list 52 to the causal-file list 53, for example, as illustrated in FIG. 8, and provides an id to the added information.

In step S36, the pattern comparison unit 24 determines whether or not the record whose id is i is the last record in the occurrence pattern list 52, as determination of the end of loop process 4. When the record whose id is i is not the last record in the occurrence pattern list 52, loop process 4 is repeated. When the record is the last record, loop process 4 is ended, and the process proceeds to step S37 which is the next step.

In step S37, the pattern comparison unit 24 outputs, to the causal-item determination unit 26, the causal-file list 53 obtained in the storing operation in step S35 described above, and the process returns back to the analysis process illustrated in FIG. 14.

Figure 18:
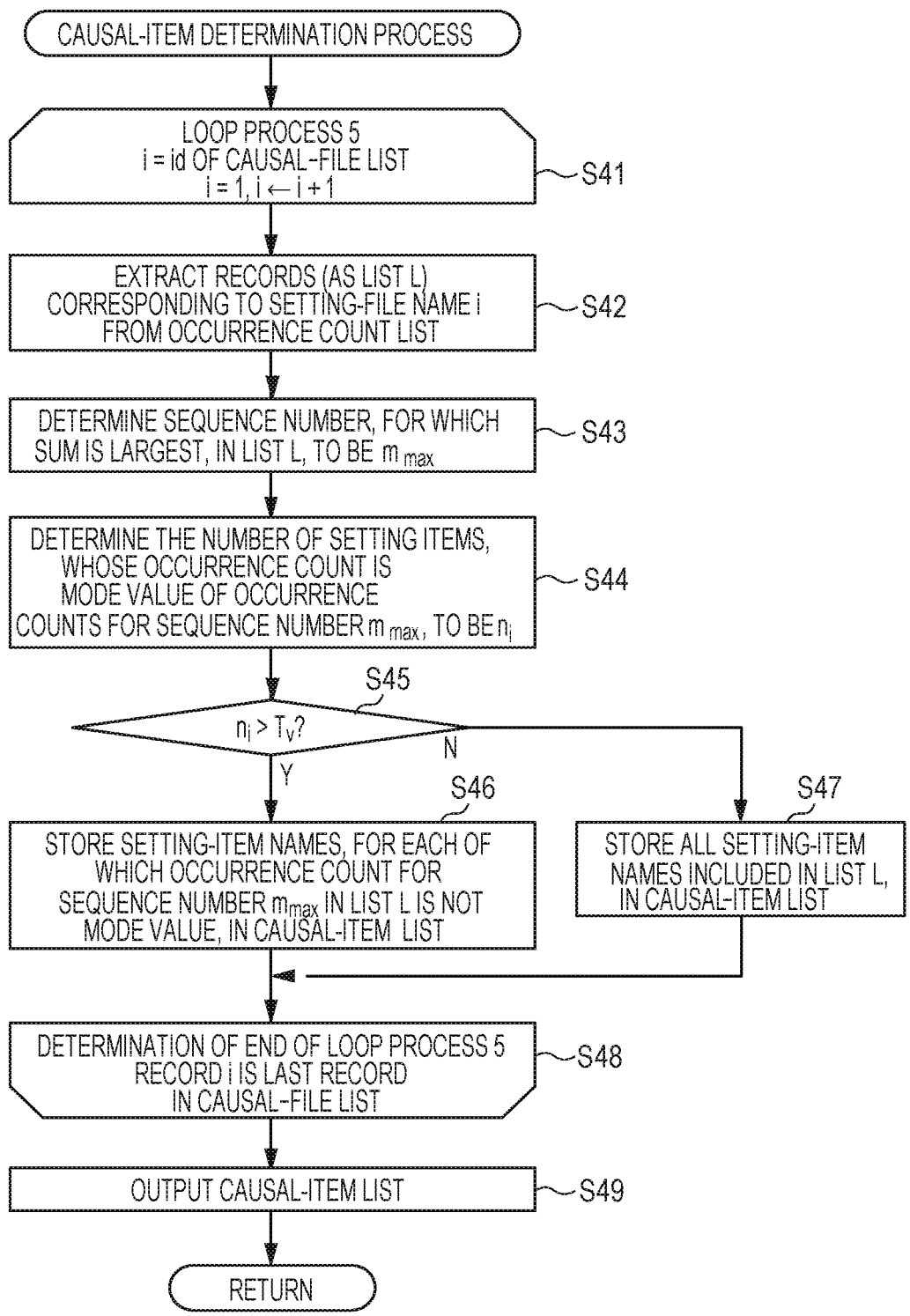
FIG. 18 is a diagram illustrating an example of an operational flowchart for a causal-item determination process, according to an embodiment.

In step S40 in the analysis process, a causal-item determination process of which the details are illustrated in FIG. 18 is performed.

In step S41 of the causal-item determination process of which the details are illustrated in FIG. 18, the causal-item determination unit 26 performs loop process 5. In loop process 5, the causal-item determination unit 26 sets 1 to the initial value of a variable i corresponding to the id of the causal-file list 53. While incrementing i by 1, the causal-item determination unit 26 performs the processes in steps S42 to S47.

In step S42, the causal-item determination unit 26 extracts records, each of which includes the same setting-file name as the setting-file name i of the causal-file list 53, among the records in the occurrence count list 51 that is output from the setting-item extraction unit 22. The extracted records are denoted as a list L.

In step S43, the causal-item determination unit 26 determines a certain sequence number to be used for determination of causal items. For example, a sum of occurrence counts of the setting-item names for each sequence number is calculated in the list L, and the sequence number for which the sum is the largest is determined to be the certain sequence number $m_{max}$. In step S44, the causal-item determination unit 26 obtains the mode value n of the occurrence counts for the sequence number $m_{max}$ in the list L, and determines the number of setting items for which the occurrence count is n to be $n_i$.

In step S45, the causal-item determination unit 26 determines whether or not $n_i$ is larger than the predetermined threshold $T_v$. The process proceeds to step S46 when $n_i > T_v$, and the process proceeds to step S47 when $n_i \leq T_v$.

In step S46, the causal-item determination unit 26 determines, to be causal items, setting items which are included in the list L for the sequence number $m_{max}$ and for which the occurrence counts are not the mode value n. The causal-item determination unit 26 stores, in the causal-item list 44, the incident ID i and the setting-file name i of the causal-file list 53, and the setting-item names determined to be causal items, for example, as illustrated in FIG. 9, and provides an id to the stored information.

In contrast, in step S47, the causal-item determination unit 26 determines, to be causal items, all of the setting items included in the list L, and, similarly to step S46 described above, stores the determined setting items in the causal-item list 44.

In step S48, the causal-item determination unit 26 determines whether or not the record whose id is i is the last record in the causal-file list 53, as determination of the end of loop process 5. When the record whose id is i is not the last record in the causal-file list 53, loop process 5 is repeated. When the record is the last record, loop process 5 is ended, and the process proceeds to step S49 that is the next step.

In step S49, the causal-item determination unit 26 outputs the causal-item list 44 obtained in the storing operation in step S46 or S47 described above, and the process returns back to the analysis process illustrated in FIG. 14. Then, the analysis process ends.

The analysis process may be performed every time the incident information 41 is created after actions taken in response to an incident are completed. Alternatively, when actions taken in response to multiple incidents are completed, the analysis process for the incidents may be performed at a time. In either case, the above-described analysis process is performed on each piece of incident information 41.

Figure 19:
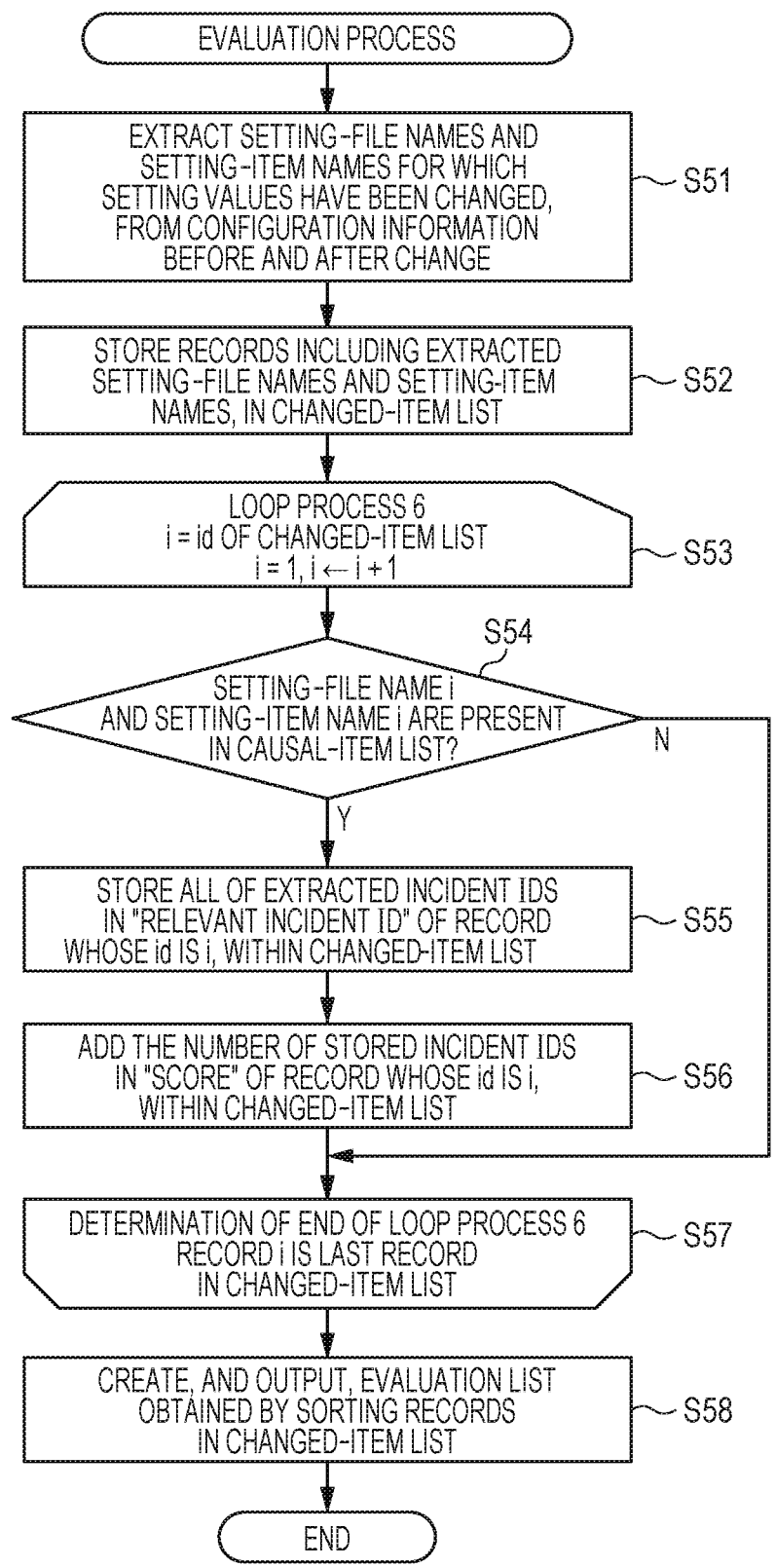
FIG. 19 is a diagram illustrating an example of an operational flowchart for an evaluation process, according to an embodiment.

The evaluation process illustrated in FIG. 19 will be described. In step S51, the changed-item extraction unit 32 obtains the configuration information 45 before and after change of setting values, extracts the setting-file names and the setting-item names of the setting files and the setting items for which setting values have been changed, and also extracts the setting values before and after setting.

In step S52, the changed-item extraction unit 32 stores records including the extracted setting-file names and setting-item names and the setting values before and after change in the changed-item list 54, for example, as illustrated in FIG. 11. In the records, 0 is set in the "score" field, and a blank is set in the "relevant incident ID" field.

In step S53, the incident associating unit 34 performs loop process 6. In loop process 6, the incident associating unit 34 sets 1 to the initial value of a variable i corresponding to the id of the changed-item list 54. While incrementing i by 1, the incident associating unit 34 performs the processes in steps S54 to S56.

In step S54, the incident associating unit 34 determines whether or not a record including a setting-file name and a setting-item name matching the setting-file name i and the setting-item name i of the changed-item list 54 is present in the causal-item list 44. When such a record is present, the process proceeds to step S55. When such a record is not present, the process proceeds to step S57.

In step S55, the incident associating unit 34 extracts the incident IDs of the records that are present in the causal-item list 44 and that include a setting-file name and a setting-item name matching the setting-file name i and the setting-item name i of the changed-item list 54. The incident associating unit 34 stores all of the extracted incident IDs in the "relevant incident ID" field of the record with id i, within the changed-item list 54.

In step S56, the incident associating unit 34 adds the number of incident IDs stored in the "relevant incident ID" field in step S55 described above, in the "score" field of the record with id i, within the changed-item list 54.

In step S57, it is determined whether or not the record with id i is the last record in the changed-item list 54, as determination of the end of loop process 6. When the record with id i is not the last record in the changed-item list 54, loop process 6 is repeated. When the record is the last record, loop process 6 is ended, and the process proceeds to step S58 that is the next step.

In step S58, the incident associating unit 34 creates the evaluation list 46 obtained by sorting the records in the changed-item list 54 in descending order of the score, and outputs the created evaluation list. Then, the evaluation process ends.

As described above, according to the embodiment, attention is focused on the fact that an occurrence pattern of setting-item names appearing in the action records for incident information has certain characteristics. Thus, an occurrence pattern based on the occurrence counts of the setting-item names which are obtained for each sequence number of an action record is created. The created occurrence pattern is compared with a model pattern created from incident information caused by setting errors so that setting-file names and setting-item names that may cause the incident occurring due to setting errors are determined.

In a case where setting values are changed in a processing apparatus, the determined setting-file names and setting-item names may be used to evaluate whether or not each changed item may cause an incident occurring due to setting errors.

In the above-described embodiment, a case, in which setting items that may cause an incident occurring due to setting errors are determined and in which evaluation is made also for each setting-item, has been described, but cases are not limited to this. Determination may be made only on the setting files corresponding to occurrence patterns similar to model patterns, that is, the causal files. In this case, when a changed item is to be evaluated, incident IDs may be associated in accordance with whether or not the setting file for which setting values have been changed matches a setting file stored in the causal-file list.

In the above-described embodiment, a case in which configuration information before and after change of setting values is obtained and in which changed items are extracted from the difference has been described. This is not limiting. For example, a list of setting-file names and setting-item names for which setting values have been changed may be obtained, or only configuration information after change in which flags are added to changed items may be obtained.

In the description above, the embodiment in which the action-record analysis program 70 which is an example of an action-record analysis program provided in the technique disclosed herein is stored (installed) in advance in the storage device 63 has been described. This is not limiting. The action-record analysis program provided in the technique disclosed herein may be provided in such a manner as to be stored in a recording medium, such as a compact disc-read-only memory (CD-ROM), a digital versatile disc-read-only memory (DVD-ROM), and a Universal Serial Bus (USB) memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

for each of setting files, obtaining, from a plurality of first action records, an occurrence count value that is associated with the each first action record and indicates a number of occurrences of a setting-item name identifying each of setting items of the each setting file, in association with a sequence number assigned to the each first action record, each of the plurality of first action records recording an action that is taken in response to a first incident occurring in an apparatus; and when there exists a first setting file for which an occurrence pattern generated based on a sequence of occurrence count values that are each associated with different one of the sequence numbers assigned to the plurality of first action records for the first incident is similar to a model pattern that is in advance obtained from a plurality of second action records for second incidents occurring due to a setting error of a setting value that is set to the first setting file, storing the first setting file in association with identification information of the first incident.

2. The non-transitory, computer-readable recording medium of claim 1, wherein the occurrence pattern for each of the setting files is configured as a sequence of first values each associated with different one of the sequence numbers assigned to the plurality of first action records so that the sequence of first values are arranged in order of the associated sequence numbers, and so that each of the sequence of first values is a ratio of a first number to a number of all of setting-item names for the each setting file, the first number being a number of setting-item names whose occurrence count value associated with each sequence number is different from a mode value of the occurrence count values associated with the each sequence number, the mode value indicating at least one of the occurrence count values that occurs most frequently among all of the setting-item names for the each setting file in association with the each sequence number.

3. The non-transitory, computer-readable recording medium of claim 1, wherein an occurrence pattern for each of the setting files is configured as a sequence of first values each associated with different one of the sequence numbers assigned to the plurality of action records so that the sequence of first values are arranged in order of the associated sequence numbers, and so that each of the sequence of first values is a value obtained by multiplying a ratio of a first number to a number of all of setting-item names for the each setting file by an average of the occurrence count values associated with the each sequence number, the first number being a number of setting-item names whose occurrence count value associated with each sequence number is different from a mode value of the occurrence count values associated with the each sequence number, the mode value indicating at least one of the occurrence count values that occurs most frequently among all of the setting-item names for the each setting file in association with the each sequence number.

4. The non-transitory, computer-readable recording medium of claim 1, the process further comprising:

determining, based on the occurrence count values of setting-item names for the first setting file, at least one setting item among the setting items to be a cause of occurrence of the first incident, and storing a first setting-item name indicating the at least one setting item in association with the identification information of the first incident.

5. The non-transitory, computer-readable recording medium of claim 4, the process further comprising:

when a first occurrence number indicating a number of setting items whose occurrence count values associated with a predetermined sequence number are different from a mode value of the occurrence count values, associated with the each sequence number, for all of the setting-item names of the each setting file is less than a predetermined threshold, determining all of the setting items included in the each setting file to be the at least one setting item that causes the first incident; and, when the first occurrence number is equal to or greater than the predetermined threshold, determining the setting items whose occurrence count values are different from the mode value to be the at least one setting item that causes the first incident.

6. The non-transitory, computer-readable recording medium of claim 5, wherein the predetermined sequence number is set at a sequence number at which a total of occurrence count values of the setting-item names of the setting items in the first setting file is largest among all of the sequence numbers, or set at a last sequence number associated with one of the plurality of action records in which at least one of the setting-item names appears.

7. The non-transitory, computer-readable recording medium of claim 1, the process further comprising:

when a setting-file name of a second setting file whose setting value has been changed matches any one of setting-file names of the first setting files associated with the identification information of the first incident, outputting information indicating that the second setting file includes a setting item causing the first incident occurring due to a setting error.

8. The non-transitory, computer-readable recording medium of claim 4, the process further comprising:

when a second setting file including a second setting item whose setting value has been changed match a setting file including a setting-item whose setting-item name is stored in association with the identification information of the first incident, outputting information indicating a setting file name of the second setting file and a setting-item name of the second setting item, in association with the identification information of the first incident.

9. The non-transitory, computer-readable recording medium of claim 8, the process further comprising:

outputting the information so that, as a number of pieces of identification information of incidents stored in association with a setting-file name and a setting-item name matching the setting-file name and the setting-item name for which the setting value has been changed is larger, the setting-file name and the setting-item name for which the setting value has been changed are output higher in ranking order.

10. The non-transitory, computer-readable recording medium of claim 9, the process further comprising:

outputting the information so that, as a time from a beginning to an end of an action taken in response to an incident that is indicated by identification information and that is associated with the setting-file name and the setting-item name for which the setting value has been changed is longer, the setting-file name and the setting-item name for which the setting value has been changed are output higher in ranking order.

11. The non-transitory, computer-readable recording medium of claim 9, wherein
each of the plurality of action records includes information indicating a type of an incident on which an action indicated by one of the plurality of action records has been performed; and
the process further comprises:
when a pair of a setting file and a setting item for which a setting value has been changed is associated with plural pieces of identification information of incidents, outputting the information so that, as the pieces of identification information of the incidents associated with the pair of the setting-file and the setting item include a larger number of pieces of identification information of incidents of an identical type, a pair of a setting-file name of the setting file and a setting-item name of the setting item is output higher in ranking order.

12. A method comprising:
for each of setting files, obtaining, from a plurality of first action records, an occurrence count value that is associated with the each first action record and indicates a number of occurrences of a setting-item name identifying each of setting items of the each setting file, in association with a sequence number assigned to the each first action record, each of the plurality of first action records recording an action that is taken in response to a first incident occurring in an apparatus; and
when there exists a first setting file for which an occurrence pattern generated based on a sequence of occurrence count values that are each associated with different one of the sequence numbers assigned to the plurality of first action records for the first incident is similar to a model pattern that is in advance obtained from a plurality of second action records for second incidents occurring due to a setting error of a setting value that is set to the first setting file, storing the first setting file in association with identification information of the first incident.

13. The method of claim 12, further comprising:
determining, based on the occurrence count values of setting-item names for the first setting file, at least one setting item among the setting items to be a cause of occurrence of the first incident, and
storing a first setting-item name indicating the at least one setting item in association with the identification information of the first incident.

14. The method of claim 12, further comprising:
when a setting-file name of a second setting file whose setting value has been changed matches any one of setting-file names of the first setting files associated with the identification information of the first incident, outputting information indicating that the second setting file includes a setting item causing the first incident occurring due to a setting error.

15. An apparatus comprising:
a memory; and
a processor coupled to the memory and configured to:
for each of setting files, obtain, from a plurality of first action records, an occurrence count value that is associated with the each first action record and indicates a number of occurrences of a setting-item name identifying each of setting items of the each setting file, in association with a sequence number assigned to the each first action record, each of the plurality of first action records recording an action that is taken in response to a first incident occurring in another apparatus, and
when there exists a first setting file for which an occurrence pattern generated based on a sequence of occurrence count values that are each associated with different one of the sequence numbers assigned to the plurality of first action records for the first incident is similar to a model pattern that is in advance obtained from a plurality of second action records for second incidents occurring due to a setting error of a setting value that is set to the first setting file, store the first setting file in association with identification information of the first incident.

16. The apparatus of claim 15, wherein
the processor is further configured to:
determine, based on the occurrence count values of setting-item names for the first setting file, at least one setting item among the setting items to be a cause of occurrence of the first incident, and
store a first setting-item name indicating the at least one setting item in association with the identification information of the first incident.

17. The apparatus of claim 15, wherein
the processor is further configured to:
when a setting-file name of a second setting file whose setting value has been changed matches any one of setting-file names of the first setting files associated with the identification information of the first incident, output information indicating that the second setting file includes a setting item causing the first incident occurring due to a setting error.

\* \* \* \* \*